(12) United States Patent
Ryu

(10) Patent No.: US 8,937,907 B2
(45) Date of Patent: Jan. 20, 2015

(54) METHOD AND APPARATUS FOR HANDLING SIGNALS USED FOR EXTENDED ACCESS CLASS BARRING IN A WIRELESS COMMUNICATION

(71) Applicant: LG Electronics Inc., Seoul (KR)

(72) Inventor: Ki Seon Ryu, San Diego, CA (US)

(73) Assignee: LG Electronics Inc., Seoul (KR)

( * ) Notice: Subject to any disclaimer, the term of this patent is extended or adjusted under 35 U.S.C. 154(b) by 203 days.

(21) Appl. No.: 13/673,698

(22) Filed: Nov. 9, 2012

(65) Prior Publication Data

US 2013/0121225 A1    May 16, 2013

Related U.S. Application Data

(60) Provisional application No. 61/558,446, filed on Nov. 11, 2011.

(30) Foreign Application Priority Data

Nov. 8, 2012  (WO) ................ PCT/KR2012/009362

(51) Int. Cl.
*H04W 4/00*    (2009.01)
*H04W 52/02*   (2009.01)

(52) U.S. Cl.
CPC ................................ *H04W 52/0229* (2013.01)
USPC ............ 370/328; 370/342; 370/344; 370/347

(58) Field of Classification Search
USPC .......... 370/311, 328, 342, 343, 344, 345, 347
See application file for complete search history.

(56) References Cited

U.S. PATENT DOCUMENTS

| | | | |
|---|---|---|---|
| 8,780,810 B2 * | 7/2014 | Ryu et al. ...................... | 370/328 |
| 2008/0218209 A1 | 9/2008 | Lee et al. | |
| 2009/0221306 A1 | 9/2009 | Jacobsohn et al. | |
| 2010/0061354 A1 | 3/2010 | Maheshwari et al. | |
| 2010/0081454 A1 | 4/2010 | Wang et al. | |
| 2012/0263039 A1* | 10/2012 | Ou et al. ...................... | 370/235 |
| 2013/0051325 A1* | 2/2013 | Ryu et al. ...................... | 370/328 |
| 2013/0107778 A1* | 5/2013 | Ryu et al. ...................... | 370/311 |
| 2013/0128733 A1* | 5/2013 | Lee et al. ...................... | 370/230 |
| 2014/0071930 A1* | 3/2014 | Lee et al. ...................... | 370/329 |
| 2014/0079013 A1* | 3/2014 | Kim et al. ...................... | 370/329 |
| 2014/0120938 A1* | 5/2014 | Widell et al. ................. | 455/453 |

FOREIGN PATENT DOCUMENTS

KR    10-2007-0108830 A     11/2007

* cited by examiner

*Primary Examiner* — Jeffrey M Ruthkowski
(74) *Attorney, Agent, or Firm* — Birch, Stewart, Kolasch & Birch, LLP

(57) ABSTRACT

A method and apparatus for extended access barring (EAB) in a wireless communication system. In detail, the present description proposes EAB indication information, which is included in the paging message. The EAB indication information is included in the paging message only when as least one access class (AC) is barred by EAB operation of the network. Alternatively, the EAB indication information can be included in the paging message when EAB information in a system information block (SIB) has been changed or updated. Further, the present description proposes a timer associated with the EAB indication information. The timer is used to ensure the validity of the EAB indication information to the UE while the timer is running by a user equipment (UE). While the timer is running, a specific value or information indicated by the EAB indication information in a paging message is assumed to be valid/correct by the UE.

16 Claims, 11 Drawing Sheets

US 8,937,907 B2

METHOD AND APPARATUS FOR HANDLING SIGNALS USED FOR EXTENDED ACCESS CLASS BARRING IN A WIRELESS COMMUNICATION

CROSS-REFERENCE TO RELATED APPLICATIONS

The present application for patent claims priority to Provisional Application No. 61/558,446 filed on Nov. 11, 2011, and International Application No. PCT/KR2012/009362 filed on Nov. 8, 2012, which are incorporated herein by reference.

BACKGROUND OF THE INVENTION

1. Field of the Invention

The technical features of this document relate to machine type communication (MTC) in wireless communications, and more particularly, to a method and apparatus for performing random access procedure with extended access barring.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication or machine-type communication (MTC) is the communication between machines that do not necessarily need human intervention. The 3GPP has started an effort to determine potential network optimizations that could lower the operational costs associated with offering these new M2M services.

SUMMARY OF THE INVENTION

A method and apparatus receiving data associated with extended access barring (EAB) in a wireless communication system are provided. The method is performed by an MTC device which can be a terminal having MTC features. In detail, the present description proposes EAB indication information, which is included in the paging message. The EAB indication information is included in the paging message only when as least one access class (AC) is barred by EAB operation of the network. Alternatively, the EAB indication information can be included in the paging message when EAB information in a system information block (SIB) has been changed or updated. Accordingly, the EAB indication information can be included in the paging message when as least one access class (AC) is barred by the EAB operation and/or when the EAB included in the SIB has been changed/updated. Further, the present description proposes a timer associated with the EAB indication information. The timer is used to ensure the validity of the EAB indication information to the UE while the timer is running by a user equipment (UE). While the timer is running, a specific value or information indicated by the EAB indication information in a paging message is assumed to be valid/correct by the UE.

In one aspect, the method comprises receiving EAB information via a system information block (SIB) from a network; entering idle-state upon receiving the EAB information; waking up to receive a paging message from the network and determining whether EAB indication information, which is included in the paging message, indicates whether at least one access class (AC) of UEs is barred by the network or the EAB information is changed; starting a timer associated with the EAB indication information upon receiving the paging message; determining whether to start random access to the network before the timer expires; if the UE starts the random access to the network before the timer expires, performing the random access by using the EAB information without waiting for reception of an additional paging message when the EAB indication information included in the paging message indicates no AC is barred by the network or the EAB information is not changed; and if the UE starts the random access to the network after the timer expires, performing the random access after receiving subsequent information from the network by using the received subsequent information, wherein the subsequent information is one of a subsequent paging message and a subsequent SIB.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
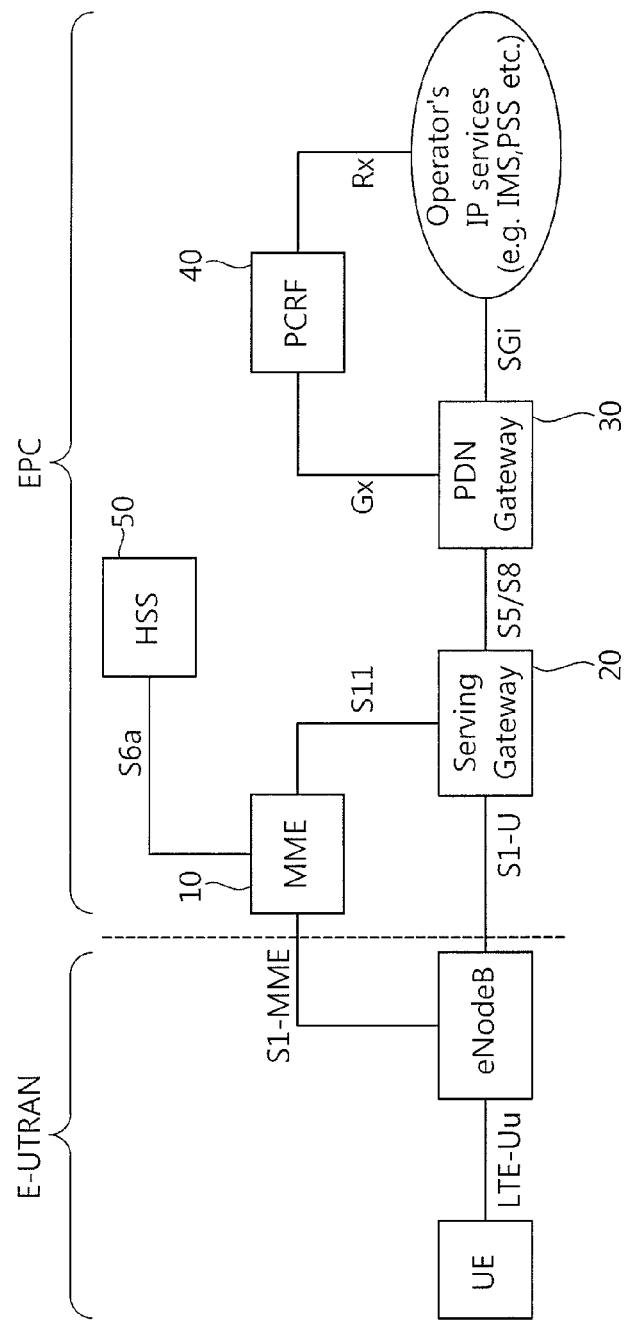
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
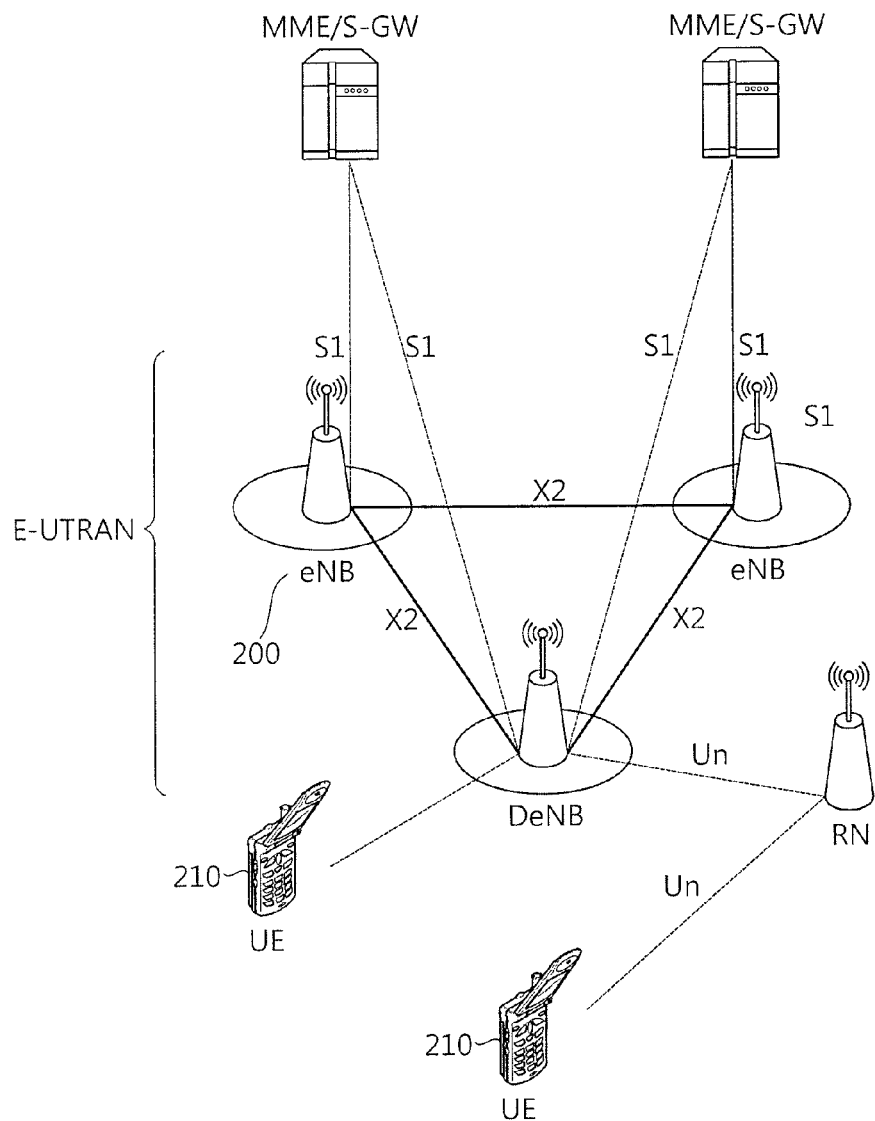
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

Here, features related to machine-type communication (MTC) are further explained. As discussed above, MTC is the communication between machines that do not necessarily need human intervention, and the 3GPP has started an effort to determine potential network optimizations. The MTC, which is also referred to as machine-to-machine (M2M), is expected to have applications in areas, such as smart metering, home automation, e-Health, fleet management, etc. In 3GPP LTE, the support of MTC (or M2M) nodes, or interchangeably delay-tolerant access or low priority access, requires very efficient operating mechanisms and protocols for the traffic channel and random access channel.

MTC has a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, random access procedure is explained. The random access procedure can be initiated with an Access Class (AC) barring, which is also referred to as AC barring, or ACB. Further, AC barring applied to LTE system can be referred to as LTE ACB, or Rel-10 ACB. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring time for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring time value. For ACs 11-15, if the UE initiates an MO call and the relevant AC barring parameters are included; access is barred whenever the bit corresponding to all of the UE's AC is set. The behavior is similar in the case of UE-initiated MO signaling.

Figure 3:
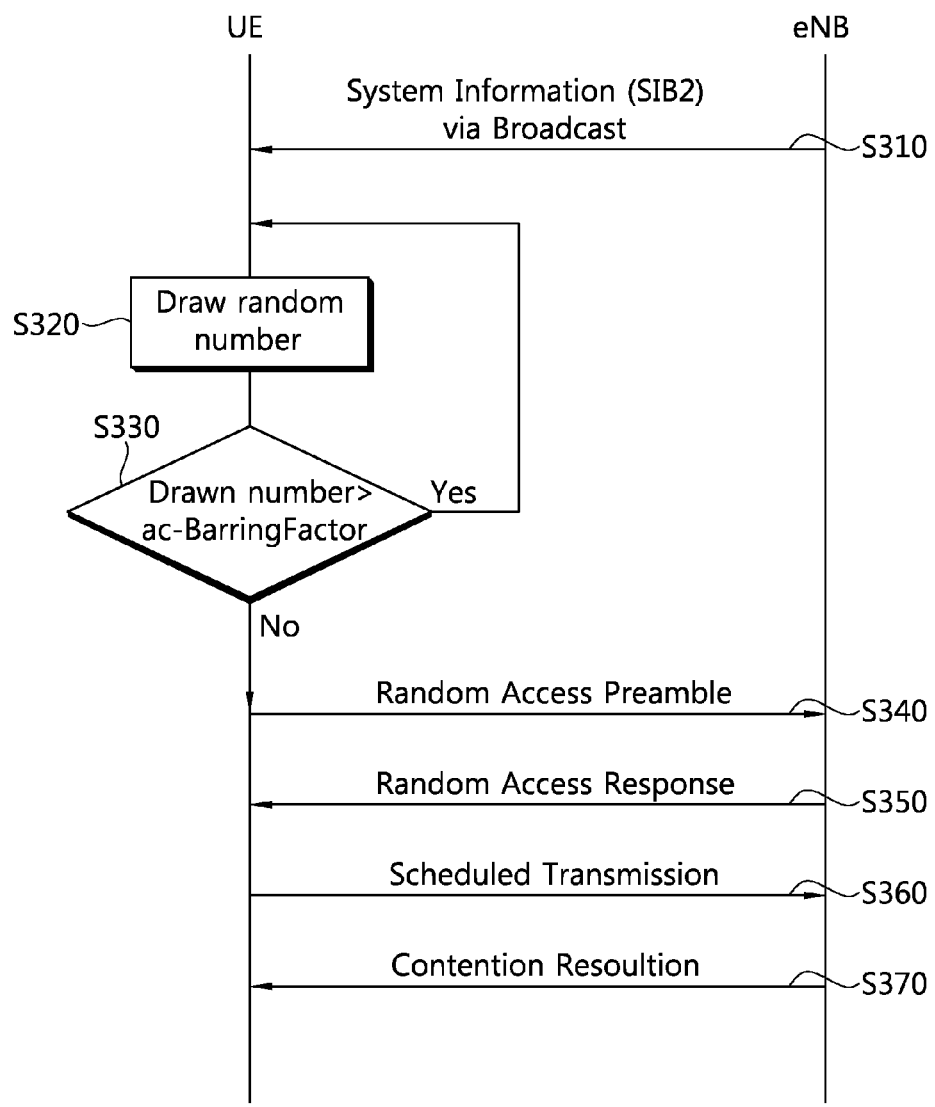
FIG. 3 is a flow diagram showing a random access procedure which is used for an embodiment of the proposed method.

FIG. 3 is a flow diagram showing a random access procedure which is enhanced by an embodiment of the proposed mechanism.

In order to obtain new connection (e.g., a data connection or signaling connection) UEs first performs a RA procedure and this is a common feature in most cellular system. Further, the RA procedure can be categorized into contention-based and contention-free. The example depicted in FIG. 3 is directed to the contention-based RA procedure.

In step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0, 1).

If the random number drawn is less than the 'ac-BarringFactor', the UE performs subsequent steps of the RA procedure (S330).

In step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to radio resource allocation information included in the random access response. The scheduled message, which is also referred to as a 'Message 3', may include a radio resource control (RRC) connection request message.

In step S370, the BS receives the scheduled message from the UE, and then transmits a contention resolution message, which is also referred to as a Message 4, to the UE. In order to check whether contention occurs with respect to the Message 3, a contention resolution timer is initiated after transmitting the Message 3. If the Message 4 is not successfully received until the contention resolution timer expires, step S370 may be repeated based on predefined configuration.

After the RRC connection request message (S360) is received by the network, an RRC connection can be successfully established and the UE enters an RRC connected mode. However, the RRC connection request may be rejected, and the UE may thereafter receive an 'RRCConnectionReject' message from the eNB. Further, the UE may consider that the RRC connection requested is regarded as rejected without explicitly receiving the 'RRCConnectionReject' when the contention resolution timer expires without receiving the Message 4. In these cases, a certain delay, which is referred to as 'wait time' in 3GPP context, can be applied before performing the AC barring to avoid the large number of UE-initiated call attempts. In particular, the UE is required to avoid a subsequent AC barring during the wait time, which is indicated by the network. In the standard, a range of the wait time is set to [1, 16 (sec)]. In addition, if an 'RRCConnectionRelease' message is received by a UE, the wait time is also applied before performing the AC barring. The RRCConnectionRelease message is received when the RRC Connection is released after the RRC connection is successfully established.

Recently, 3GPP has newly introduced an 'extendedWaitTime', which is an extended version of the above-mentioned wait time. Accordingly, the extended wait time is applicable to a case where a request for RRC connection is regarded as rejected or an RRC connection is released. Meanwhile, the extended wait time can be additionally used with the wait time. Namely, for a certain UE, both the wait time and the extended wait time can be applied.

A range of the extended wait time was originally set to [1, 4096 (sec)], but recently changed to [1, 1800 (sec)]. An exact time value of the extended wait time can be contained in the 'RRCConnectionReject' or 'RRCConnectionRelease' message. Once the extended wait time is contained, the UE reports to the upper layer (i.e., NAS layer), sets the timer value as the received 'extendedWaitTime', and starts the timer of the extended wait time. While the timer is running, the UE is not allowed to attempt an RRC connection request. The use of 'extendedWaitTime' is to prevent the UE (released or rejected) from attempting 'RRCConnectionRequest' for a longer period of time than the wait time. The concept of the extended wait time is highly associated with the aforementioned M2M communications, delay tolerant accesses, and/or lower priority accesses. Namely, it is preferred that the extended wait time should be applied to a UE, which has M2M, delay tolerant, and/or lower priority characteristics. For instance, if the UE is identified as an M2M (or MTC) devices, and/or a cause code in RRC messages (e.g., RRC connection request/release messages) is identified as 'delay tolerant' or 'lower priority', the extended wait time is applicable. Meanwhile, it is noted that even H2H devices (e.g., human UEs), as opposed to M2M devices, can have the delay tolerant or lower priority characteristics, when a certain connection or an application in the H2H devices has such characteristics.

The present description is related to extended access barring (EAB), which is applicable to UEs supporting delay tolerant (e.g., MTC, M2M, lower priority) services. In other words, the present description can be beneficial to a UE configured for EAB. The UE configured for/with EAB implies a UE which supports delay-tolerant access and/or low priority access. Any MTC or M2M nodes can be the UE configured for/with EAB.

Detailed features and requirements of EAB are disclosed in 3GPP TS 22.011 V11.0.0. The EAB which is applicable to delay tolerant services is corresponding to the aforementioned Access Class (AC) barring procedure which is applicable to conventional human to human (H2H) communication. The EAB can be performed together with or instead of the conventional AC barring (i.e., legacy AC barring). In other word, an EAB operation can be performed together with or instead of LTE ACB, or Rel-10 ACB.

Based on 3GPP standards, the following requirements are considered:

EAB is a mechanism for the operator(s) to control Mobile Originating (MO) access attempts from UEs that are configured for EAB in order to prevent overload of the access network and/or the core network.

In congestion situations, the operator can restrict access from UEs configured for EAB while permitting access from other UEs.

UEs configured for EAB are considered more tolerant to access restrictions than other UEs.

When an operator determines that it is appropriate to apply EAB, the network broadcasts necessary information to provide EAB control for UEs in a specific area.

Further, the following requirements are also applied:

The UE is configured for EAB by the Home PLMN (HPLMN).

EAB shall be applicable to all 3GPP Radio Access Technologies.

EAB shall be applicable regardless of whether the UE is in a Home or a Visited PLMN.

Relevant information to enable the UE to perform EAB should be provided to the UE. In this description, such information is referred to as 'EAB information'. The EAB information should include the following information:

The EAB information shall define whether EAB applies to UEs within one of the following categories: a) UEs that are configured for EAB; b) UEs that are configured for EAB and are neither in their HPLMN nor in a PLMN that is equivalent to it; c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

Further, the EAB information shall also include extended barring information for Access Classes 0-9. For instance, various information can be included in the EAB information to restrict access UEs with various Access Classes. For instance, bitmap information in which respective bits represent whether a certain Access Class is barred can be included in the EAB information. In particular, 10-bit information each representing ACs 0-9 together with at least two bits representing a category of the UE can be included in the EAB information. Alternatively, a probability factor and a barring time for a certain Access Class can be included in the EAB information.

The UE configured for EAB shall use its allocated Access Class(es), as defined in sub-clause 4.2 of 3GPP TS 22.011 V11.0.0, when evaluating the EAB information that is broadcast by the network, in order to determine if its access to the network is barred.

When performing EAB, the following requirement also should be applied:

If the UE that is configured for EAB initiates an emergency call or is a member of an Access Class in the range 11-15 and according to clause 4.3.1 of 3GPP TS 22.011 V11.0.0 that Access Class is permitted by the network, then the UE shall ignore any EAB information that is broadcast by the network.

If the network is not broadcasting the EAB information, the UE shall be subject to access barring as described in clause 4.3.1 of 3GPP TS 22.011 V11.0.0.

If the EAB information that is broadcast by the network does not bar the UE, the UE shall be subject to access barring as described in clause 4.3.1 of 3GPP TS 22.011 V11.0.0.

In the case of multiple core networks sharing the same access network, the access network shall be able to apply the EAB for the different core networks individually.

It should be noted that the following agreements have been made for EAB information and operations related to EAB:

Somehow the UE knows whether at a certain radio resource control (RRC) connection establishment it needs to apply EAB or not.

Broadcast Control Channel (BCCH) broadcasts EAB information.

The EAB information on BCCH indicates which 'category' of UEs configured with EAB apply EAB.

UEs configured with EAB check their categories (i.e. category a, b, c) in order to decide whether or not to apply EAB.

If UE is establishing the RRC connection for emergency call, UE configured with EAB applies no EAB.

If UE has no special AC, UE configured with EAB applies EAB for non-emergency calls.

If the EAB information is not available on BCCH, UEs configured with EAB apply no EAB, but apply Rel-10 ACB.

While detailed features of EAB in 3GPP standards have not been finalized yet, following agreements are made for EAB information and operations related to EAB:

The UE associated with high priority access can ignore any EAB information. If a UE that is configured for EAB initiates an emergency call or is a member of an Access Class in the range 11-15, the UE shall ignore any EAB information that is broadcast by the network.

In the case of multiple core networks sharing the same access network, EAB information can be PLMN specific.

The contents of the EAB information can be configured based on the type of communication system. For UMTS system, the EAB information can be bitmap information in which 1 bit information is set for corresponding Access Class (AC). For instance, 10 bits can be used for ACs 0-9 to indicate whether respective ACs is barred or not. Alternatively, features of legacy ACB (e.g., probability factor and barring time) can be provided as the EAB information for LTE system.

While a number of conventional mechanisms used for EAB information update and acquisition purposes (e.g., value tag or SI modification period based mechanism) were introduced, recently, a number of alternatives for EAB information update and acquisition have been proposed. Examples of proposed alternatives include:

Based on a first alternative, a mechanism based on 'EAB in a new SIB+UE is required to read corresponding SIB (or check valueTag) prior to EAB-based access' can be used.

Based on a second alternative, a mechanism based on 'EAB in a new SIB+Dedicated paging message for new SIB' can be used. In detail, the EAB information is included in a new type of SIB, and dedicate signaling (e.g., paging message) is further used to indicate whether the EAB information has been updated. The second alternative is similar to the first alternative except the use of the paging message.

Based on a third alternative, a mechanism based on 'EAB in random access response (RAR)' can be used. In detail, the EAB information is delivered to the UE through the random access response. The third alternative can cause problems where updated EAB information cannot be used to control access load for initial random access preamble transmission because EAB is not applicable to UE's first random access trial. Further, the third alternative can cause problems of decoding the RAR before attempting random access, which increases UE's complexity.

Figure 4:
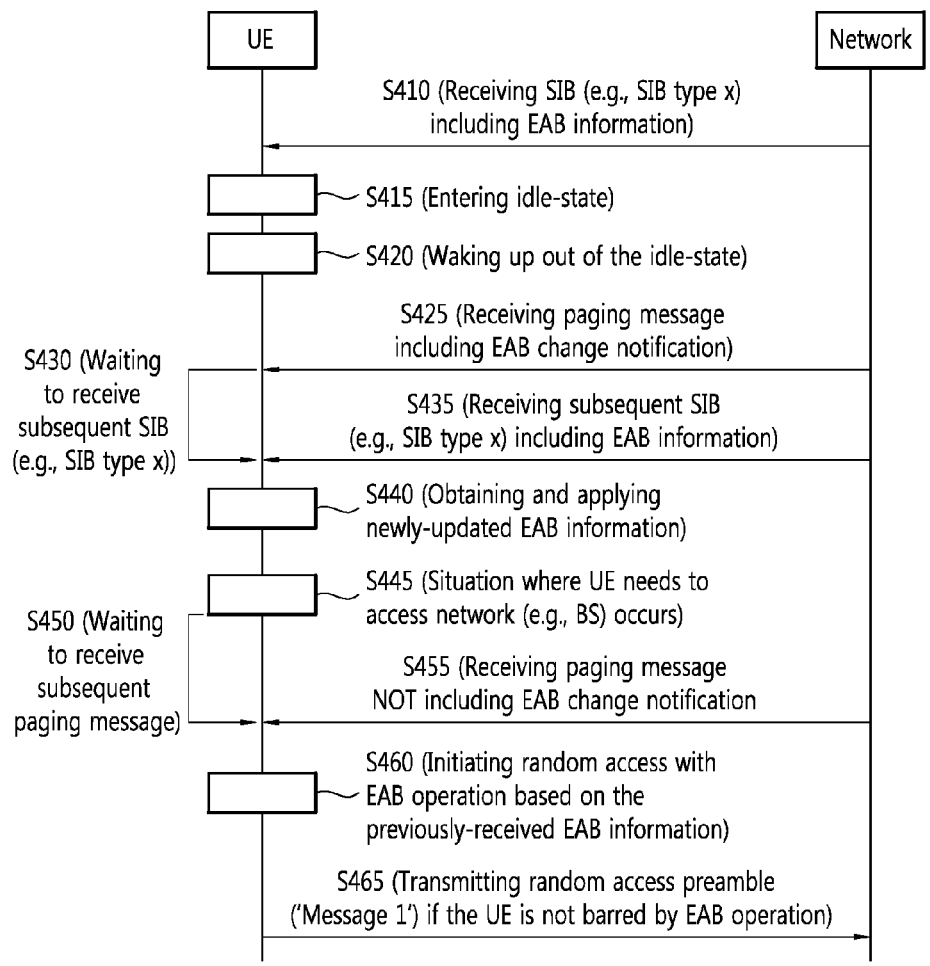
FIG. 4 is a flow diagram showing reception of the EAB change information included in the paging message.

To improve the performance of the above-explained alternatives, a paging message including EAB change information, which indicates whether EAB information has been updated can be used. FIG. 4 is a flow diagram showing reception of the EAB change information included in the paging message.

An example depicted in FIG. 4 is applicable to a UE configured with/for MTC features and a network (e.g., a base station) configured for communication with the UE. The UE in FIG. 4 can support two different states, i.e., active-state and idle-state. During the idle-state, the UE can skip reception of downlink channel and wake-up upon receiving data assigned to the UE (e.g., a paging message dedicated to the UE). The idle-mode can start upon receiving a system information block (SIB) described in Step S410 in FIG. 4. For instance, the active-state/idle-state operation can be associated with a Discontinuous Reception (DRX) operation. DRX functionality can be configured for an 'RRC_CONNECTED' UE so that it does not always need to monitor the downlink channels. A DRX cycle consists of an 'On Duration' during which the UE should monitor the PDCCH and a 'DRX period' during which a UE can skip reception of downlink channels for battery saving purposes.

In Step S410, the UE receives the EAB information via a system information block (SIB). The SIB used in S410 can be newly-designed SIB of which transmission period is greater than any of convention SIBs. Upon receiving the SIB of S410, the UE may enter idle-state (S415). The operation of idle-state and active-state can be performed in a periodic manner, and the UE may periodically wake up out of the idle-state to receive a paging from the network (S420).

After waking up (i.e., entering active-state), the UE receives a paging message including EAB change notification (S425). The EAB change notification can be included in the paging message only when the EAB information has been changed/updated.

After the UE receives the EAB change notification in the paging message, the UE waits to receive a subsequent SIB (e.g., the newly-designed SIB) to obtain changed/updated EAB information via such subsequent SIB (S430). Thereafter, the UE receives the subsequent SIB of S435, and the UE obtains and applies the newly-updated EAB information of the subsequent SIB in Steps S435-S440.

By performing Steps S410-S440, the UE can obtain and apply the changed/updated EAB information. If there occurs a situation where the UE needs to access (i.e., random access) the network, the UE should wait to receive a subsequent paging message (S445-S450). This is because the UE intending to access the network should first check the EAB and thereafter transmit a random access preamble only when the UE is not barred by EAB operation. Namely, FIG. 4 requires the UE to receive the paging when random access is required to the UE. In the meantime, examples of the situation where the UE needs to access the network include a situation where uplink data to be transmitted to the network has generated in the UE.

In Step S455, the UE can receive a subsequent paging message which does not include the EAB change notification. In this case, the UE does not need to wait for a subsequent SIB, since the EAB information stored by the UE would be most up-to-dated. Then, the UE initiates random access subject to the EAB operation, which is performed based on the previously-received EAB information (S460). If the UE is not barred by the EAB operation, the UE transmits a random access preamble ('Message 1') to the network (S465).

Although FIG. 4 improves the performance of the above-explained alternatives, FIG. 4 has a number of technical drawbacks as follows:

Problem 1: FIG. 4 incurs a delay directly related to transmission cycle (i.e., periodic transmission duration) of a paging message. It should be noted that such paging cycle is configured to align with the nominal operation of the cell, not with mitigating RAN (radio access network) overload conditions.

Problem 2: FIG. 4 consumes more battery due to frequent change of EAB information during RAN congestion if the change of EAB information occurs as the UE wakes up to read/obtain the paging message. Given a situation where the UE has no uplink data to be transmitted to the network, frequent waking-up can waist the battery life. Moreover, it may be technically difficult to apply FIG. 4 to a UE configured for/with the MTC (e.g., MTC device), since such UE may use reduced paging cycle or turn off to conserve UE power.

Problem 3: Based on FIG. 4, UEs should be subject to a significant delay to adopt/read/obtain the updated EAB information, because UEs might have a longer paging cycle (e.g., 2560 ms or more). Furthermore, paging resource overhead may cause deterioration of performance.

The present description proposes a number of features to solve the above-identified technical problems.

To solve Problem 1, at least one example of the present description proposes a newly-designed 'EAB indication information", which is included in the paging message. Before starting initial random access with EAB check, the UE uses the EAB indication information in any previously-received paging message. The EAB indication information indicates whether the UE should receive and read a newly-designed SIB, which includes the EAB information, before performing the random access to a base station.

For instance, the EAB indication information is included in the paging message only when as least one access class (AC) is barred by EAB operation of the network. Namely, if the network decides to bar/block radio access attempted from at least one AC by means of the EAB operation, a certain information field associated with the 'EAB indication information' can be included in the paging message. Alternatively, the EAB change notification can be implemented as a 1-bit flag, which is set to 'on' (or a certain value) when the EAB operation is perform by the network.

Alternatively, the EAB indication information can be included in the paging message when EAB information in a system information block (SIB) has been changed or updated. For instance, the EAB indication information can be included in the paging message only when the EAB included in the SIB is changed/updated. Further, the EAB indication information can be included in the paging message only when the EAB included in the SIB is changed or only when the at least one AC is barred by the EAB operation.

To solve Problem 2, at least one example of the present description proposes the UE to obtain/read the SIB including the EAB information only when the UE is required to perform random access. Namely, if the UE determines that random access is not required, the UE does not receive a SIB including the EAB information, thereby reducing battery consumption even in case where the EAB indication information in the page message is set to 'on' to indicates that the EAB operation is working to at least one AC of UEs. For instance, if the UE which has already received the EAB indication information indicating 'on' does not have UL traffic to be transmitted to the network, such UE is not required to update the ISB including the EAB information.

To solve Problem 3, at least one example of the present description proposes a timer (Timer T) associated with the EAB indication information. The timer is used to guarantee/ensure the validity of the EAB indication information to the UE while the timer is running by the UE. While the timer is running, a specific value or information indicated by the EAB indication information in a paging message is assumed to be valid/correct. Therefore, while the timer is running, the UE can operate based on the previously-received EAB indication information. After expiration of the timer, before attempting random access to the network, the UE receives the SIB including the EAB information or receives a subsequent (next) paging message to obtain the EAB information depending on the length of a paging cycle and a certain value of the EAB indication in the paging message.

The EAB indication information can be rarely included in a paging message, since a base station uses/performs the EAB operation only for emergency situation (e.g., MTC surge event, network failure). Therefore, the introduction of the EAB indication information does not cause overhead problem compared to conventional art.

Figure 5:
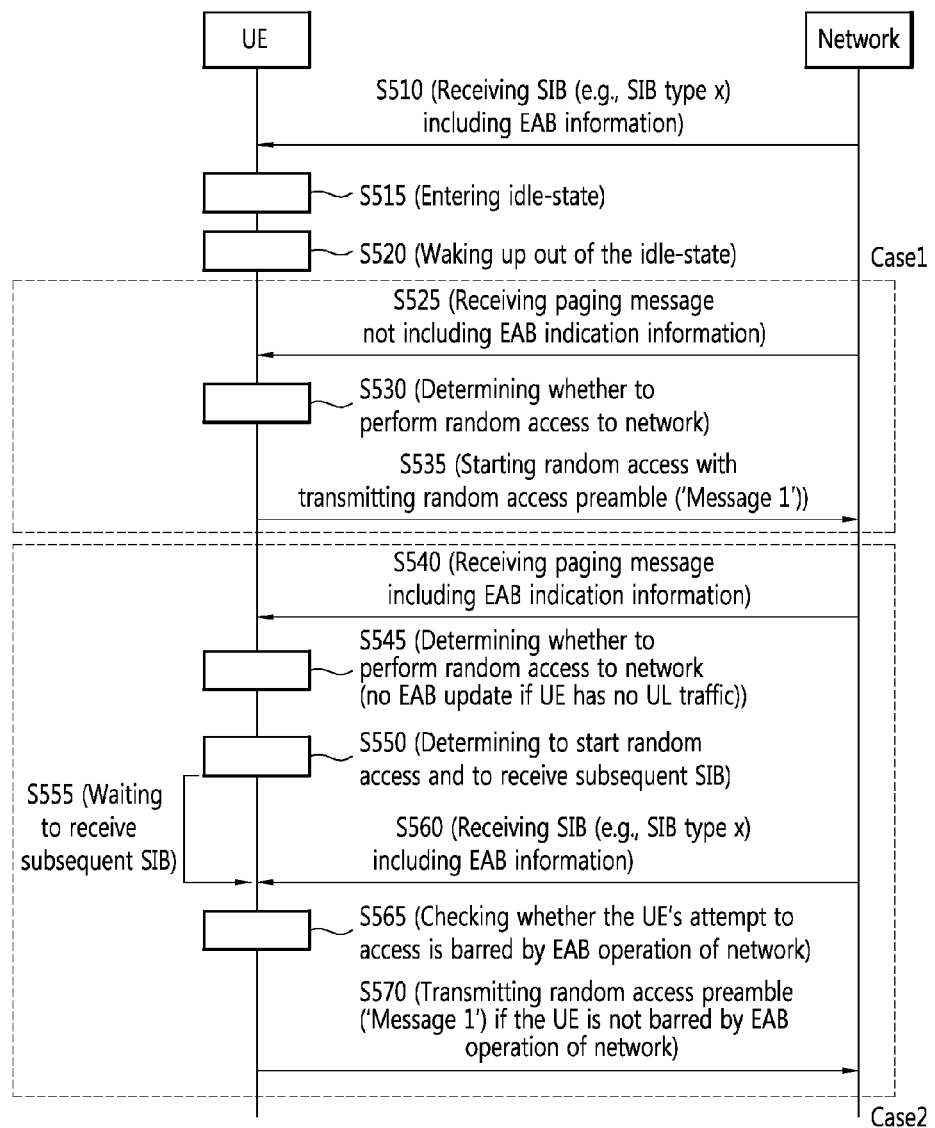
FIG. 5 is a flow chart showing EAB update mechanism to which a number of proposed features are applied.

FIG. 5 is a flow chart showing EAB update mechanism to which a number of proposed features are applied.

In Step S510, the UE receives the EAB information via a system information block (SIB). The SIB used in S510 can be a newly-designed SIB of which transmission period is greater than any of convention SIBs. Upon receiving the SIB of S510, the UE may enter idle-state (S515). The operation of idle-state and active-state can be performed in a periodic manner, and the UE may periodically wake up to receive a paging from the network (S520).

FIG. 5 is applicable to two different cases, a first case ('Case 1') where no AC is barred (or where the EAB information in the SIB is changed) and a second case ('Case 2) where at least one AC is barred by EAB operation (or where the EAB information in the SIB is changed).

In Case 1, the UE receives a paging message not including EAB indication information, which means that no access class (AC) of UEs is barred by the network or that the EAB information in the SIB has not been changed compared to previously-transmitted information (S525). In this case, the UE can skip reception of a subsequent SIB for EAB purposes, since the EAB operation is not performed (or the EAB information is not changed). In S530, the UE determines whether to perform random access to the network. If UE has uplink traffic to the network, the UE determines to start random access with transmitting a random access preamble ('Message 1') (S535).

In Case 2, the UE receives a paging message including EAB indication information, which means the EAB operation is working or the EAB information in the SIB is changed (S540). In this case, without updating the EAB information (i.e., without waiting for reception of a subsequent SIB), the UE first determines whether to perform random access to a network (S545). For instance, if the UE has no UL traffic, then the UE does not attempt to update the EAB information.

Thereafter, the UE may have UL traffic to be transmitted to the network. Namely, the UE may determine to start random access in a certain situation (S550). In this case, the UE determines to receive a subsequent SIB and waits to receive the subsequent SIB (S550-S555). Upon receiving the SIB including the EAB information, the UE checks whether the UE's attempt to access is barred by EAB operation of network (S560-S565). If the UE's attempt is barred, the UE can transmit a random access preamble ('Message 1') to the network.

Hereinafter, examples to which the above-explained timer (Timer T) is applied are explained in detail. In details, the present description provides FIGS. 6-10 to improve the performance of EAB acquisition and update.

Figure 6:
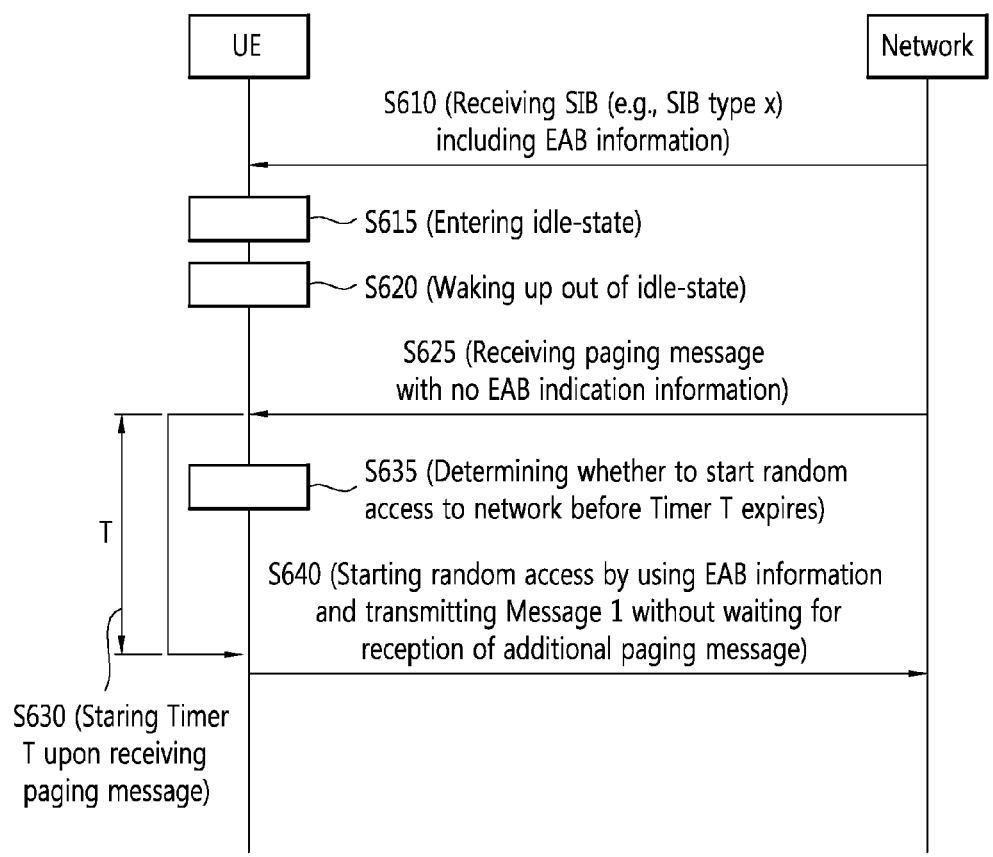
FIG. 6 is a flow chart showing EAB update mechanism for a case where the EAB indication information of paging indicates no AC is barred (or EAB information is not changed) and the UE needs to access before the expiration of Timer T.

FIG. 6 is a flow chart showing EAB update mechanism for a case where the EAB indication information of paging indicates no AC is barred (or indicates the EAB information in the SIB is not changed) and the UE needs to access before the expiration of Timer T. An activation duration (T) during which Timer T is running by the UE can be set based on a transmission period of the SIB including the EAB information. For instance, the activation duration of the timer is set to one transmission period of the SIB including the EAB information. Alternatively, the activation duration of the timer is set to a multiple of the transmission period of the SIB including the EAB information.

As shown in Steps S610-S620, the UE receives the EAB information via a system information block (SIB) and enters idle or active state. In Step S625, the UE receives a paging message with no EAB indication information, which indicates no AC is barred by the network by means of EAB operation or indicates the EAB information in the SIB is changed. Alternatively, the UE may receive a paging message including EAB indication information explicitly or implicitly indicating that no AC is barred by the network or the EAB information in the SIB is not changed. Once the paging message is initially received, the UE starts Timer T (S630). Timer T is configured for running during a predetermined time.

While Timer T is running, the UE may determine whether to start random access to a network before Timer T expires (S635). For instance, in a case where UL traffic is generated while Timer T is running, the UE can determine whether to start random access to the network before Timer T expires. Further, in a case where UL traffic is required to be transmitted while Timer T is running, the UE can determine whether to start random access to the network before Timer T expires.

If so, the UE can assume that no AC is barred or that the EAB information in the SIB is not changed while Timer T is running, since Timer T is designed to guarantee/ensure the validity of the EAB indication information. Therefore, the UE can immediately start random access without waiting for reception of an additional paging message or any additional control signal (S640). Namely, the UE can transmit Message 1 to the network without receiving additional paging message since no AC is barred by the network or the EAB information in the SIB is not changed. Although Message 1 shown in FIG. 6 is depicted to be transmitted after Timer T expires, it should be noted that Message 1 can be transmitted before Timer T expires.

Figure 7:
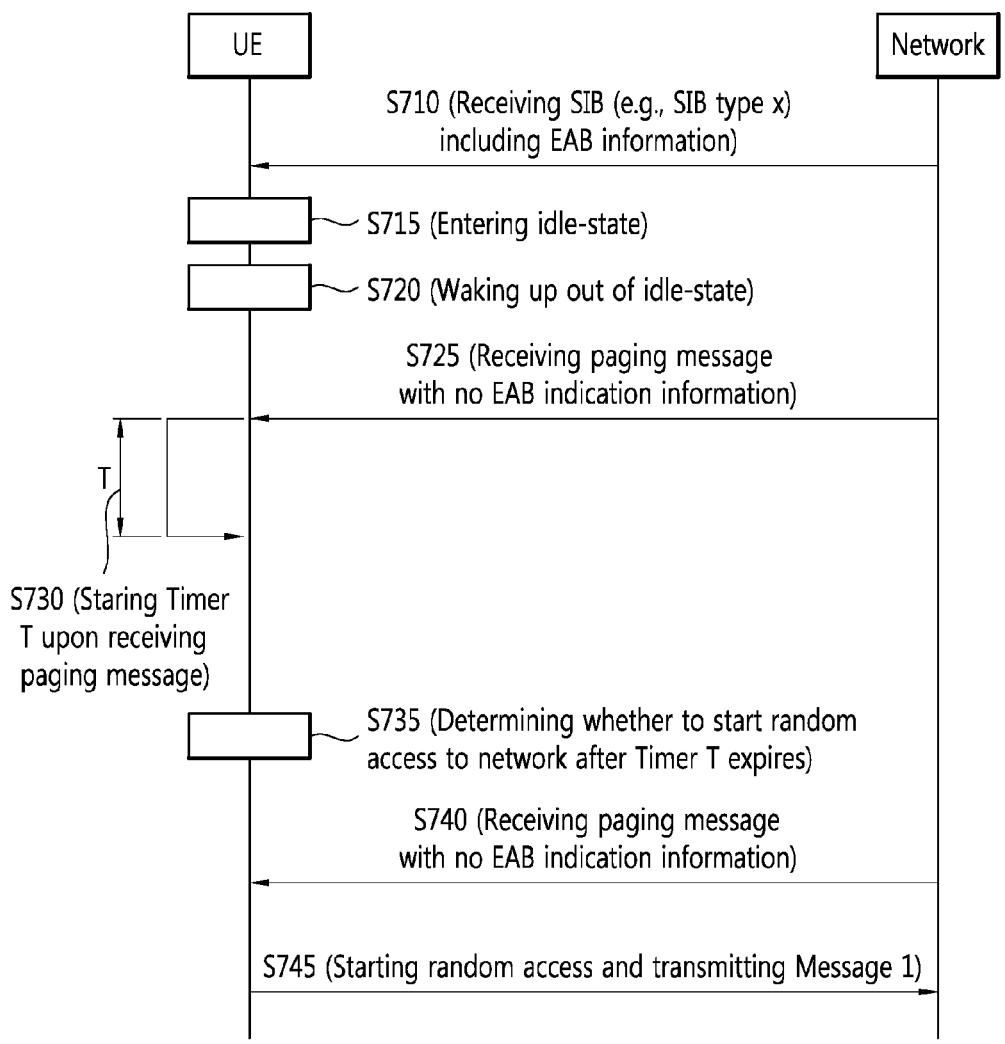
FIG. 7 is a flow chart showing EAB update mechanism for a case where the EAB indication information of paging indicates no AC is barred (or EAB information is not changed) and the UE needs to access after the expiration of Timer T.

FIG. 7 is a flow chart showing EAB update mechanism for a case where the EAB indication information of paging indicates no AC is barred (or indicates the EAB information in the SIB is not changed) and the UE needs to access after the expiration of Timer T.

As shown in Steps S710-S720, the UE receives the EAB information via a system information block (SIB) and enters idle or active state. In Step S725, the UE receives a paging message with no EAB indication information, which indicates no AC is barred by the network by means of EAB operation or indicates the EAB information in the SIB is not changed. Alternatively, the UE may receive a paging message including EAB indication information explicitly or implicitly indicating that no AC is barred by the network or that the EAB information in the SIB is not changed. Once the paging message is initially received, the UE starts Timer T (S730).

Thereafter, the UE may determine whether to start random access to the network after Timer T expires (S735). For instance, in a case where UL traffic is generated after Timer T expires, or UL traffic is required to be transmitted after the expiration, the UE can determine whether to start random access to the network after Timer T expires.

In this case, the UE cannot assume that no AC is barred or that the EAB information in the SIB is not changed since Timer T has already expired. Therefore, the UE should receive a subsequent paging message, which can include updated/changed EAB indication information. When the subsequent paging message is received, the UE is not required to start Timer T, since Timer T can be initiated only when the UE receives an initial paging after waking-up. Once the UE receives EAB indication information via the subsequent paging message of S740, the UE can determine whether at least one AC of UEs is barred by EAB operation or whether the EAB information in the SIB is changed. If AC is not barred (or if the EAB information in the SIB is not changed), the UE can immediately transmit Message 1 to the network since the EAB operation is not working, or the UE can use the previously-stored EAB information for subsequent random access (S745). If the UE receives EAB indication information via the subsequent paging message of S740, the UE may further receive an additional/subsequent SIB to obtain updated EAB information (Not shown in FIG. 7).

Figure 8:
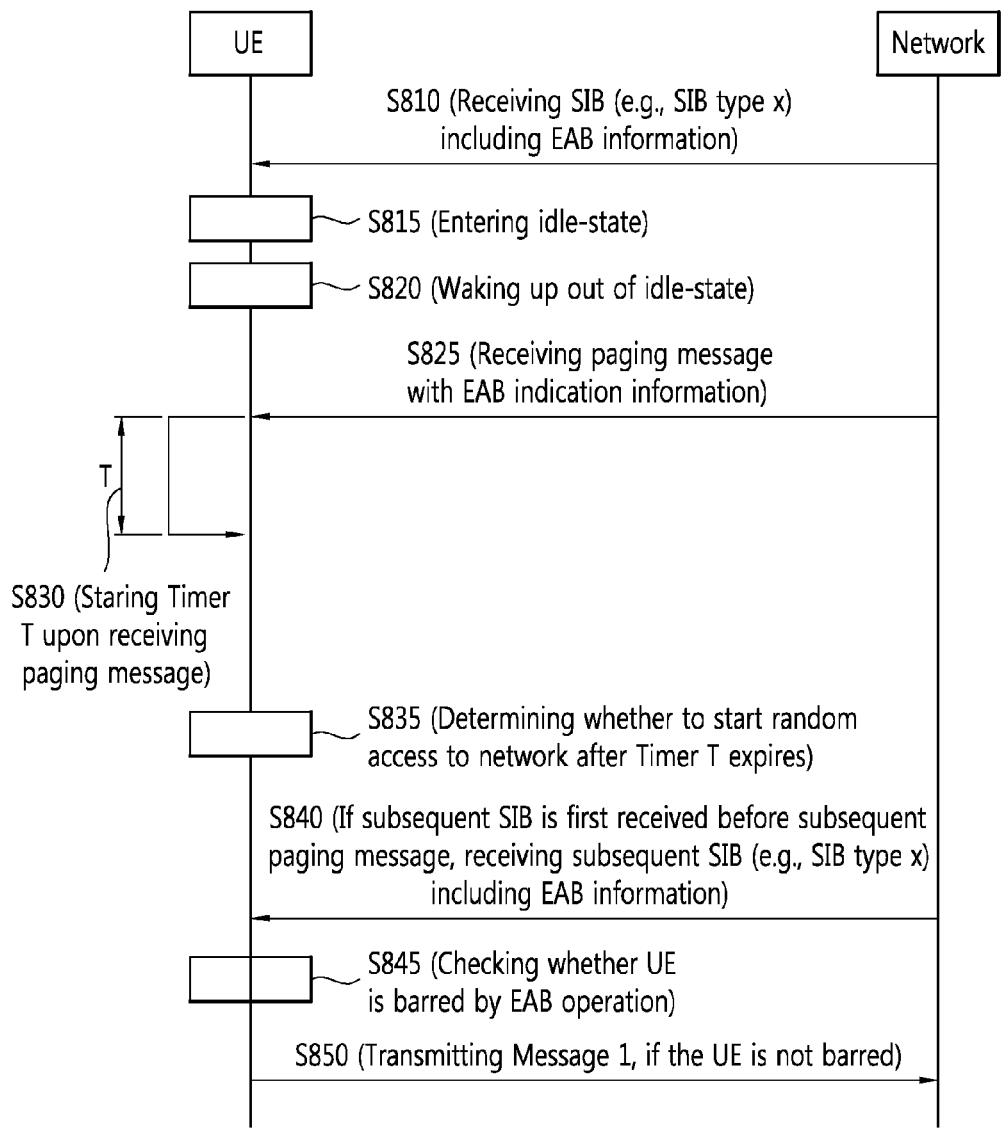
FIG. 8 is a flow chart showing EAB update mechanism for a case where the EAB indication information of paging indicates at least one AC is barred (or EAB information is changed) and the UE needs to access after the expiration of Timer T.

FIG. 8 is a flow chart showing EAB update mechanism for a case where the EAB indication information of paging indicates at least one AC is barred (or the EAB information in the SIB is changed) and the UE needs to access after the expiration of Timer T.

As shown in Steps S810-S820, the UE receives the EAB information via a system information block (SIB) and enters idle or active state. In Step S825, the UE receives a paging message with EAB indication information, which indicates at least one AC of UEs is barred by the network by means of EAB operation or indicates the EAB information in the SIB is changed. Alternatively, the UE may receive a paging message including EAB indication information explicitly or implicitly indicating that at least one AC is barred by the network or that the EAB information in the SIB is changed. Once the paging message is initially received, the UE starts Timer T (S830).

Thereafter, the UE may determine whether to start random access to the network after Timer T expires (S835). For instance, in a case where UL traffic is generated after Timer T expires, or UL traffic is required to be transmitted after the expiration, the UE can determine whether to start random access to the network after Timer T expires.

If the UE determines to start random access to the network after Timer T expires, the UE should obtain information related to EAB operation, i.e., a subsequent SIB or paging message. Depending on system configuration, the subsequent SIB can be received before receiving the subsequent paging message. In this case, the UE obtain updated/changed EAB information by receiving the subsequent SIB of S840 without waiting to receive the subsequent paging message. In Steps S845-850, the UE transmits Message 1, if the UE is not barred based on its EAB information, which is provided by S840 (S845-850).

Figure 9:
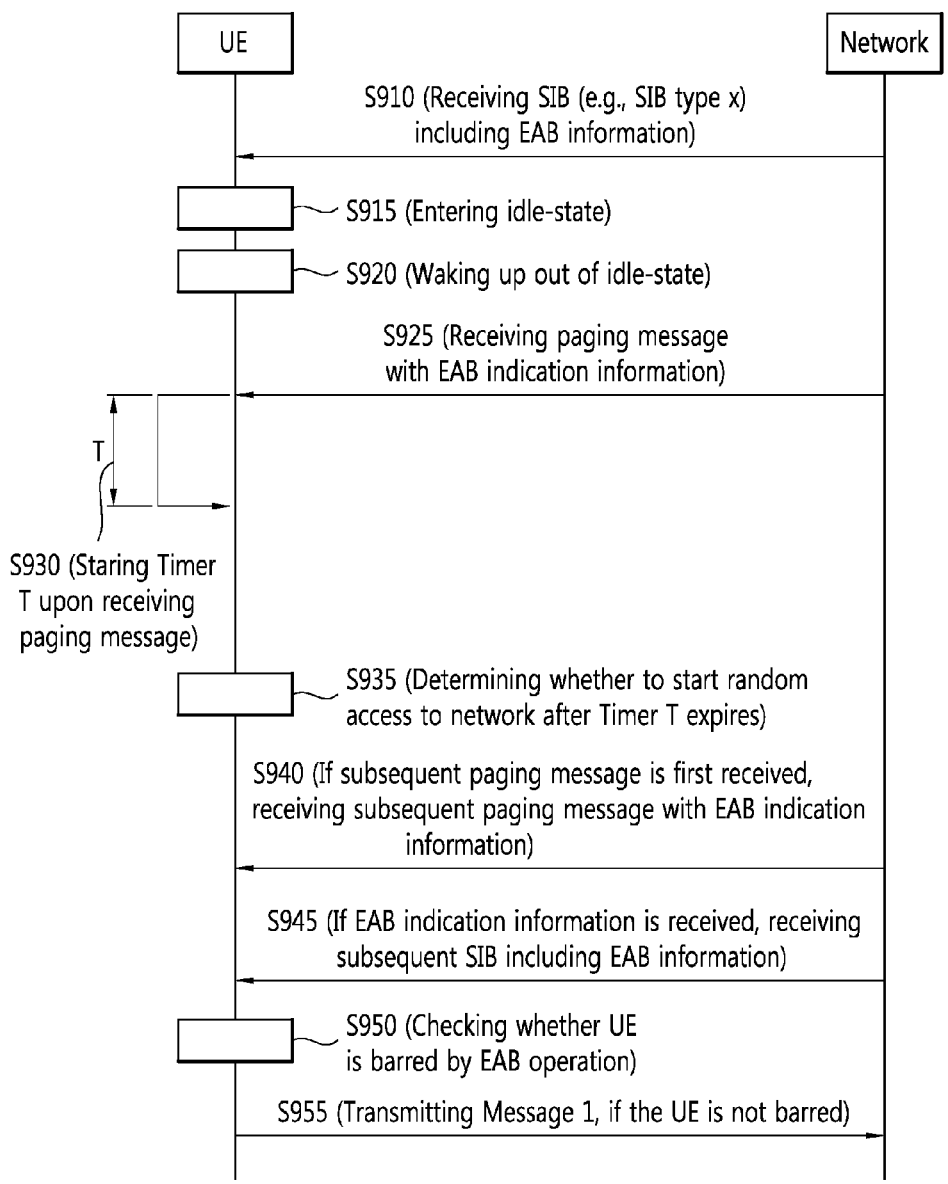
FIG. 9 is another flow chart showing EAB update mechanism for a case where the EAB indication information of paging indicates at least one AC is barred (or EAB information is changed) and the UE needs to access after the expiration of Timer T.

FIG. 9 is related to situation where the subsequent SIB is received after receiving the subsequent paging message. Accordingly, Steps S910-S935 are identical to Steps S810-S935. In step S940, the UE receives that the subsequent paging message with EAB indication information. Since the subsequent paging message is not initially transmitted paging after waking-up, Timer T is not required to be started. If the EAB indication information provided by S940 indicates at least one AC is barred by the network or indicates the EAB information in the SIB is changed, the UE further receives a subsequent SIB including EAB information (S945). Otherwise, the UE can immediately start random access since no AC is barred, or the UE uses the previously stored EAB information in the SIB for subsequent random access (Not depicted in FIG. 9). After receiving the EAB information of S945, the UE can transmit Message 1, if the UE is not barred based on its EAB information, which is provided by S945 (S950-955).

Figure 10:
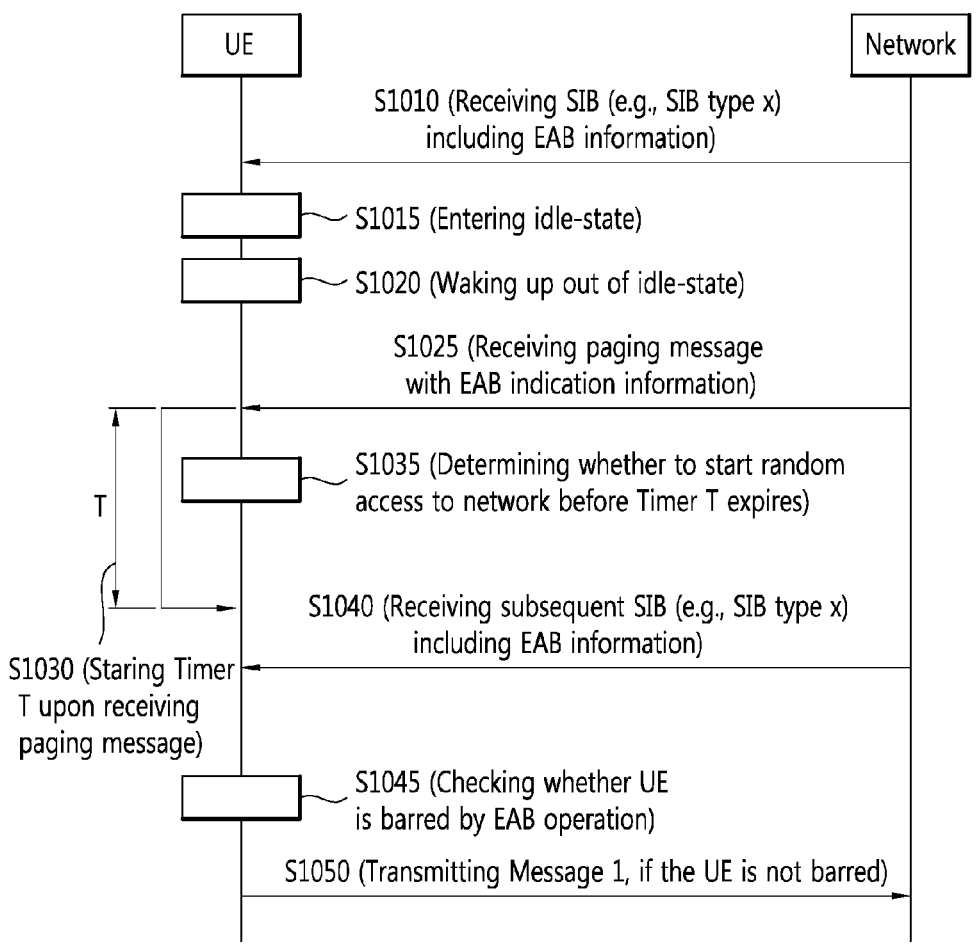
FIG. 10 is a flow chart showing EAB update mechanism for a case where the EAB indication information of paging indicates at least one AC is barred (or EAB information is changed) and the UE needs to access while Timer T is running.

FIG. 10 is a flow chart showing EAB update mechanism for a case where the EAB indication information of paging indicates at least one AC is barred (or the EAB information in the SIB is changed) and the UE needs to access while Timer T is running. Steps S1010-1030 are identical to Steps S810-S830.

While Timer T is running, the UE may determine whether to start random access to the network before Timer T expires (S1035). For instance, in a case where UL traffic is generated before Timer T expires, or UL traffic is required to be transmitted before the expiration, the UE can determine whether to start random access to the network while timer T is running.

In this case, the UE can assume that the EAB operation is applied to the network, since Timer T is activated. Therefore, the UE received a subsequent (i.e., newly-transmitted) SIB to obtain changed/updated EAB information (S1040). Although Step S1040 is depicted to be performed after Step S1030, such step can be performed before Step S1030. After receiving the subsequent SIB, the UE can transmit Message 1, if the UE is not barred based on its EAB information, which is provided by S1040 (S1045-S1050).

Figure 11:
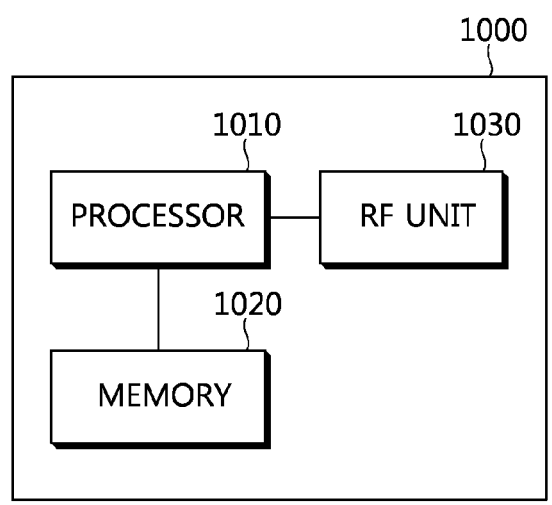
FIG. 11 is a block diagram showing a wireless apparatus to implement technical features of this description.

FIG. 11 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of handling signals used for extended access class barring (EAB) in a wireless communication, the method performed by a user equipment (UE) and comprising:
    receiving EAB information via a system information block (SIB) from a network;
    entering idle-state upon receiving the EAB information;
    entering active-state to receive a paging message from the network and determining whether EAB indication information, which is included in the paging message, indicates whether at least one access class (AC) of UEs is barred by the network or whether the EAB information is changed;
    starting a timer associated with the EAB indication information upon receiving the paging message;
    determining whether to start random access to the network before the timer expires;
    if the UE starts the random access to the network before the timer expires, performing the random access by using the EAB information without waiting for reception of an additional paging message when the EAB indication information included in the paging message indicates no AC is barred by the network or the EAB information is not changed; and
    if the UE starts the random access to the network after the timer expires, performing the random access after receiving subsequent information from the network by using the received subsequent information, wherein the subsequent information is one of a subsequent paging message and a subsequent SIB.

2. The method of claim 1, further comprising:
    if the UE starts the random access to the network after the timer expires and if the EAB indication information included in the paging message indicates no AC of UEs is barred by the network or the EAB information is not changed, receiving the subsequent paging message, and determining whether EAB indication information included in the subsequent paging message indicates whether at least one access class (AC) of UEs is barred by the network or whether the EAB information is changed.

3. The method of claim 1, further comprising:
    if the UE starts the random access to the network after the timer expires and if the EAB indication information included in the paging message indicates the at least one AC is barred by the network or the EAB information is changed, determining whether the subsequent SIB is received before the subsequent paging message is received;
    if the subsequent SIB is received before the subsequent paging message, obtaining EAB information via the subsequent SIB; and
    if the subsequent SIB is received after the subsequent paging message, determining whether EAB indication information included in the subsequent paging message indicates at least one AC of UEs is barred by the network or the EAB information is changed, and waiting for reception of an additional SIB from the network when the EAB indication information included in the subsequent paging message indicates at least one AC of UEs is barred by the network or the EAB information is changed.

4. The method of claim 1, further comprising:
    if the UE starts the random access to the network before the timer expires and if the EAB indication information included in the paging message indicates the at least one AC of UEs is barred by the network or the EAB information is changed, obtaining the EAB information via the subsequent SIB.

5. The method of claim 1, wherein determining whether to start random access to the network before the timer expires comprises:
    determining whether uplink data of the UE to be transmitted to the network is generated before the timer expires.

6. The method of claim 1, wherein determining whether to start random access to the network before the timer expires comprises:
    determining whether uplink data of the UE is required to be transmitted to the network before the timer expires.

7. The method of claim 1, wherein the EAB information indicates at least one access class (AC) of UEs which is barred by the network.

8. The method of claim 1, wherein the UE does not enter the idle-state if the UE detects data assigned to the UE on a physical downlink data control channel (PDCCH).

9. The method of claim 1, wherein an activation duration during which the timer is running by the UE is set based on a transmission period of the SIB including the EAB information.

10. The method of claim 9, wherein the activation duration of the timer is set to one transmission period of the SIB including the EAB information.

11. The method of claim 9, wherein the activation duration of the timer is set to a multiple of the transmission period of the SIB including the EAB information.

12. The method of claim 1, wherein the wireless communication uses a number of OFDM symbols to transmit the SIB and the paging message.

13. The method of claim 1, wherein the UE is a device configured with extended access class barring (EAB) and is associated with machine type communication (MTC).

14. The method of claim 1, wherein the EAB indication information is implemented as a 1-bit flag included in the paging message.

15. The method of claim 1, wherein the step of entering active-state is performed in a periodic manner.

16. A user equipment (UE) for handling signals used for extended access class barring (EAB) in a wireless communication, the method performed by a user equipment (UE) and comprising:
- a radio frequency (RF) unit configured to transmit and receive a signal; and
- a processor coupled to the RF unit and configured to:
  receive EAB information via a system information block (SIB) from a network;
  enter idle-state upon receiving the EAB information;
  enter active-state to receive a paging message from the network and determine whether EAB indication information, which is included in the paging message, indicates whether at least one access class (AC) of UEs is barred by the network or whether the EAB information is changed;
  start a timer associated with the EAB indication information upon receiving the paging message;
  determine whether to start random access to the network before the timer expires;
  if the UE starts the random access to the network before the timer expires, perform the random access by using the EAB information without waiting for reception of an additional paging message when the EAB indication information included in the paging message indicates no AC is barred by the network or the EAB information is not changed; and
  if the UE starts the random access to the network after the timer expires, perform the random access after receiving subsequent information from the network by using the received subsequent information, wherein the subsequent information is one of a subsequent paging message and a subsequent SIB.

* * * * *